(12) United States Patent
Pölling

(10) Patent No.: US 8,770,380 B2
(45) Date of Patent: Jul. 8, 2014

(54) CONVEYING MECHANISM WITH PUSHING-OFF DEVICE THAT CAN BE DRIVEN COUNTER TO THE DIRECTION OF TRAVEL

(75) Inventor: Ludger Pölling, Wadersloh-Diestedde (DE)

(73) Assignee: Beumer GmbH & Co. KG, Beckum (DE)

( * ) Notice: Subject to any disclaimer, the term of this patent is extended or adjusted under 35 U.S.C. 154(b) by 577 days.

(21) Appl. No.: 13/003,289

(22) PCT Filed: May 22, 2009

(86) PCT No.: PCT/DE2009/000737
§ 371 (c)(1),
(2), (4) Date: Jan. 20, 2011

(87) PCT Pub. No.: WO2010/003392
PCT Pub. Date: Jan. 14, 2010

(65) Prior Publication Data
US 2011/0108392 A1  May 12, 2011

(30) Foreign Application Priority Data
Jul. 10, 2008  (DE) .................. 20 2008 009 280 U

(51) Int. Cl.
*B65G 17/34* (2006.01)
*B65G 17/32* (2006.01)
*B65G 47/04* (2006.01)

(52) U.S. Cl.
USPC ................. 198/370.03; 198/618; 198/370.06; 198/475.1

(58) Field of Classification Search
None
See application file for complete search history.

(56) References Cited

U.S. PATENT DOCUMENTS

| | | | |
|---|---|---|---|
| 3,114,332 A | 12/1963 | Bacon et al. | |
| 3,880,276 A | 4/1975 | Willett, III | |
| 4,726,456 A | 2/1988 | Hogsett | |
| 4,729,466 A | 3/1988 | Bollier et al. | |
| 4,793,473 A | 12/1988 | Gilgore et al. | |
| 4,951,801 A | 8/1990 | Mraz | |
| 5,190,134 A | 3/1993 | Mraz | |
| 5,611,418 A * | 3/1997 | Helmstetter | 198/347.1 |
| 5,901,830 A * | 5/1999 | Kalm et al. | 198/370.06 |
| 6,082,522 A | 7/2000 | Poelling | |
| 6,253,901 B1 * | 7/2001 | Hintz et al. | 198/370.06 |
| 6,736,254 B1 | 5/2004 | Fortenbery et al. | |

(Continued)

FOREIGN PATENT DOCUMENTS

| | | | |
|---|---|---|---|
| DE | 20205395 U1 | 8/2002 | |
| EP | 0700 844 A3 | 5/1996 | |

(Continued)

OTHER PUBLICATIONS

International Search Report dated May 11, 2009 for PCT/DE2009/000737, 2 pages.

(Continued)

*Primary Examiner* — Kavel Singh
(74) *Attorney, Agent, or Firm* — Ganz Law, P.C.

(57) ABSTRACT

A conveyor apparatus with a plurality of transport units movable along a guide means, on the upper side of said transport units there being provided in each case a pusher means which can be driven contrary to a direction of travel of the transport units so that unit load items can be picked up and/or discharged gently.

15 Claims, 4 Drawing Sheets

(56) References Cited

U.S. PATENT DOCUMENTS

| | | | |
|---|---|---|---|
| 7,166,814 B2 * | 1/2007 | Nakanishi et al. | ............ 209/584 |
| 2004/0016679 A1 | 1/2004 | Schieleit | |
| 2004/0216985 A1 | 11/2004 | Nishihara et al. | |
| 2010/0314223 A1 | 12/2010 | Franz | |

FOREIGN PATENT DOCUMENTS

| | | | |
|---|---|---|---|
| EP | 1338346 A2 | 8/2003 | |
| EP | 1352658 A2 | 10/2003 | |
| SU | 1489855 A1 | 6/1989 | |
| WO | 9009944 A1 | 9/1990 | |
| WO | WO 91/03324 | 3/1991 | |
| WO | WO 98/31617 | 7/1998 | |
| WO | 9855379 A1 | 12/1998 | |

OTHER PUBLICATIONS

PCT Search Report and Written Opinion dated Nov. 5, 2009, in International Patent Application No. PCT/DE2009/000737; accompanied by English-Language Translation; 15 pages.

Office Action dated Feb. 6, 2013, for U.S. Appl. No. 13/201,608, 23 pages.

PCT Search Report and Written Opinion dated Jun. 15, 2010, in International Patent Application No. PCT/DE2009/01785, accompanied by English-Language Translation; 19 pages.

PCT Search Report and Written Opinion dated Mar. 21, 2012, in International Patent Application No. PCT/DE2011/001874; accompanied by English-Language Translation; 21 pages.

Decision to Grant a European Patent, dated Jan. 24, 2013, for European Patent No. 2297010; 2 pages.

* cited by examiner

CONVEYING MECHANISM WITH PUSHING-OFF DEVICE THAT CAN BE DRIVEN COUNTER TO THE DIRECTION OF TRAVEL

BACKGROUND

The invention relates to a conveyor apparatus with a number of transport units which can be moved along a guide direction.

Conveyor apparatuses of this kind for transporting unit loads are known in a variety of designs, with transverse load sorters having proven effective in gently picking up and putting down items of the unit loads; on the top side of the transport units, a carrier belt is disposed which can be driven transversely to the direction of travel of the transport units themselves, and which is driven in a given direction at a particular speed, depending on the picking-up or putting-down situation prevailing. A transverse load sorter of this kind, or crossbelt sorter, is known from EP 0 700 844 A2, for example.

Although transverse load sorters have proven effective in many practical applications, there is a disadvantage, specifically when handling sensitive items, that during the putting-down or removal process, the kinetic energy of that item of the unit load, which can sometimes be considerable, must be degraded in the discharge area, which is often associated with jolt stresses.

Alternative delivery systems have likewise been unable to change this fundamental problem, such as those in which an item of the unit load is dropped by flaps in the delivery area or scraped off the transport unit by a scraper member which it bumps into.

The invention has therefore set itself the objective of improving on a conveyor apparatus of the generic kind such that the stresses imposed on the unit load items to be delivered in the loading or unloading area are kept to a minimum despite the kinetic energy to be built up or degraded.

This problem is solved in accordance with the invention in a conveyor apparatus of the generic kind by proposing that a pusher means which can be driven contrary to a direction of travel of the transport unit is in each case provided on the upper side of the transport units so that unit load items can be picked up and/or discharged gently.

The pusher means can be drivable at a pushing speed which is at least as great as a speed of travel of the transport means concerned.

The pusher means may be designed as a pusher, i.e. in the form of a scraper or the like, or as a belt conveyor or roller table.

It may be contemplated that a conveyor surface of the pusher means is arranged parallel to the direction of travel of the transport means. In this case, the transport units may be arranged spaced apart from one another in the direction of travel, by a distance which corresponds at least to a longitudinal dimension of a unit load item to be transported.

Alternatively, it may be contemplated that a conveyor surface of the pusher means is arranged at an upward slope, seen in the direction of travel of the transport means. In this case, it may be contemplated that the transport units are arranged spaced apart from one another in the direction of travel by a distance which is smaller than a longitudinal dimension of the unit load items to be transported, and, with an appropriate slope of the conveyor surfaces, even substantially without being spaced apart from one another.

Conversely, it may be contemplated that a conveyor surface of the pusher means is arranged at a downward slope, seen in the direction of travel. In this case, it is conveniently contemplated that the transport units are arranged spaced apart from one another in the direction of travel, by a distance which corresponds at least to a longitudinal dimension of a unit load item to be transported or is greater than the latter.

With a sloping arrangement of the conveyor surface of the pusher means, it may be contemplated that the conveyor surfaces are arranged sloping at an angle of at least 2°, 5°, 10°, 15°, 20° or 30° to the horizontal.

The invention preferably contemplates that each transport unit is arranged spaced apart laterally beside the guide means. It is conveniently contemplated that two transport units in each case are arranged on either side of the guide means, opposite each other.

One variant of the invention envisages that the transport units are arranged spaced apart above the guide means. In this case, the transport units are conveniently arranged on a mount which is C-shaped, seen in the direction of travel. A receiving means may be arranged in a gap between the guide means and the transport units.

As a further alternative, it may be contemplated that the transport units are arranged spaced apart beneath the guide means. A mixed construction with transport units to the side of and/or above and/or beneath the guide means may likewise be appropriate.

BRIEF DESCRIPTION OF THE DRAWINGS

The invention will now be explained in more detail with reference to a drawing, in which

FIGS. 3a-e illustrate different variants of the invention.

Figure 1:
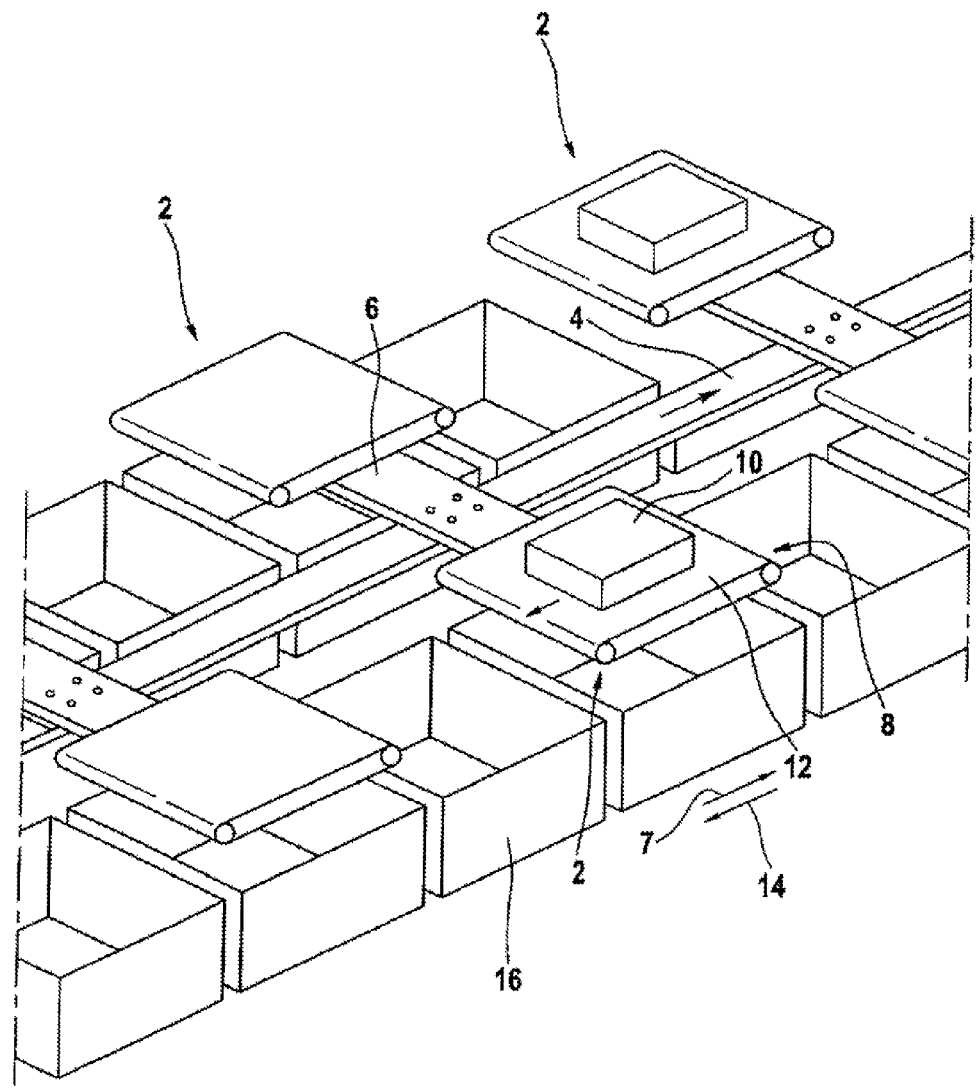
FIG. 1 shows a schematic perspective view of a conveyor apparatus of the invention.

Reference may first be made to FIG. 1, which shows the basic structure of a conveyor apparatus of the invention by way of example. A number of transport units 2 are in each case arranged in pairs on either side of a guide means 4 and mounted on, for example, carriages 6, which can be driven along the guide means in a direction of travel 7. The guide means may be formed, for example, of rails, along which the transport units can travel on rollers or wheels, and the drive may be provided by a chain, driven rollers or wheels, linear drives or the like, as is known per se in the state of the art.

Each transport unit 2 is provided on its upper side with a pusher means, which is formed, in the embodiment illustrated in FIG. 1, by a belt conveyor 8. In order to deliver a unit load item 10 located on the transport unit 2, the belt conveyor 8 can be driven in such a way that a conveyor surface 12, which forms the carrying run of the belt conveyor 8 and at the same time the upper side of the transport unit 2, is moved opposite to the direction of travel 7, in a discharge direction 14. When the transport unit 2 is moving at a predetermined speed in the direction of travel 7, it is possible in this way, by driving the belt conveyor 8 in the opposite direction, i.e. in the discharge direction 14, and at the same speed, to cause the unit load item 10 to stand still relative to its surroundings. If this state is created for a short time above a receiving means 16, the transport unit 2 in effect moves beneath the unit load item 10, so that the latter drops vertically down into the receiving means 16 without any relative horizontal speed worth mentioning. The receiving means may, for example, be a receiving container as illustrated or a discharge conveyor arranged vertically or diagonally to the guide means 4, which first picks up the unit load item 10 delivered and then transports it laterally out of the area of the conveyor apparatus.

FIGS. 2a-h illustrate such a delivery process again in more detail. FIGS. 2a-d show how a transport unit 2 still loaded with a unit load item 10 approaches a receiving means 16. Since the belt conveyor 8 and the unit load item 10 cannot accelerate abruptly to the pushing-off speed in the opposite direction to the direction of travel 7, the belt conveyor 8 must already begin to move before the position shown in FIG. 2d is reached, such as in a position as shown in FIGS. 2a, b or c.

The speed of the belt conveyor 8 when pushing off compensates for the speed of travel of the transport unit 2, so that by the time the unit load item 10 reaches the position shown in FIG. 1d, it is standing still relative to the receiving means 16; it is pushed off by the belt conveyor 8 (FIGS. 2e, f) and finally drops freely into the receiving means 16 (FIGS. 2g, h).

Figure 2:
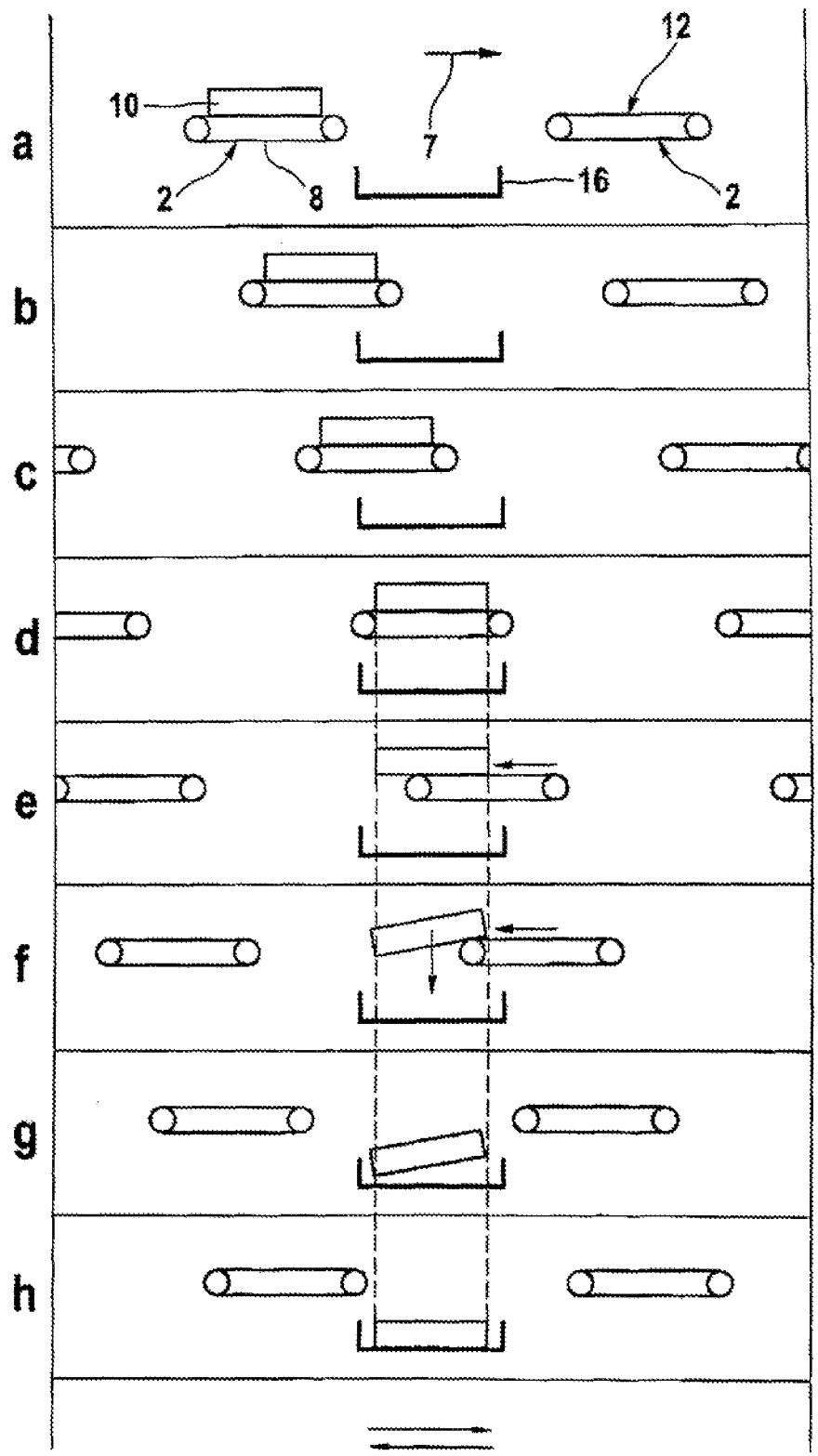
FIGS. 2a-h show successive phases of a delivery process by the conveyor apparatus of the invention.

With a horizontal arrangement of the conveyor surfaces 12 or the upper side of the transport units 2 as illustrated in FIGS. 1 and 2, it is convenient for the transport units to be arranged spaced apart from one another at a distance corresponding at least to a longitudinal dimension of the unit load item transported or to be transported 10, so that the latter can be discharged downwards with no problems in the gap between two adjacent transport units 2, as shown in FIG. 2. While the distance between two transport units in FIG. 2 corresponds approximately to double the length of the unit load item 10, it obviously must not be less than the length of the latter, so that it does not knock against the respective adjacent transport unit.

Figure 3:
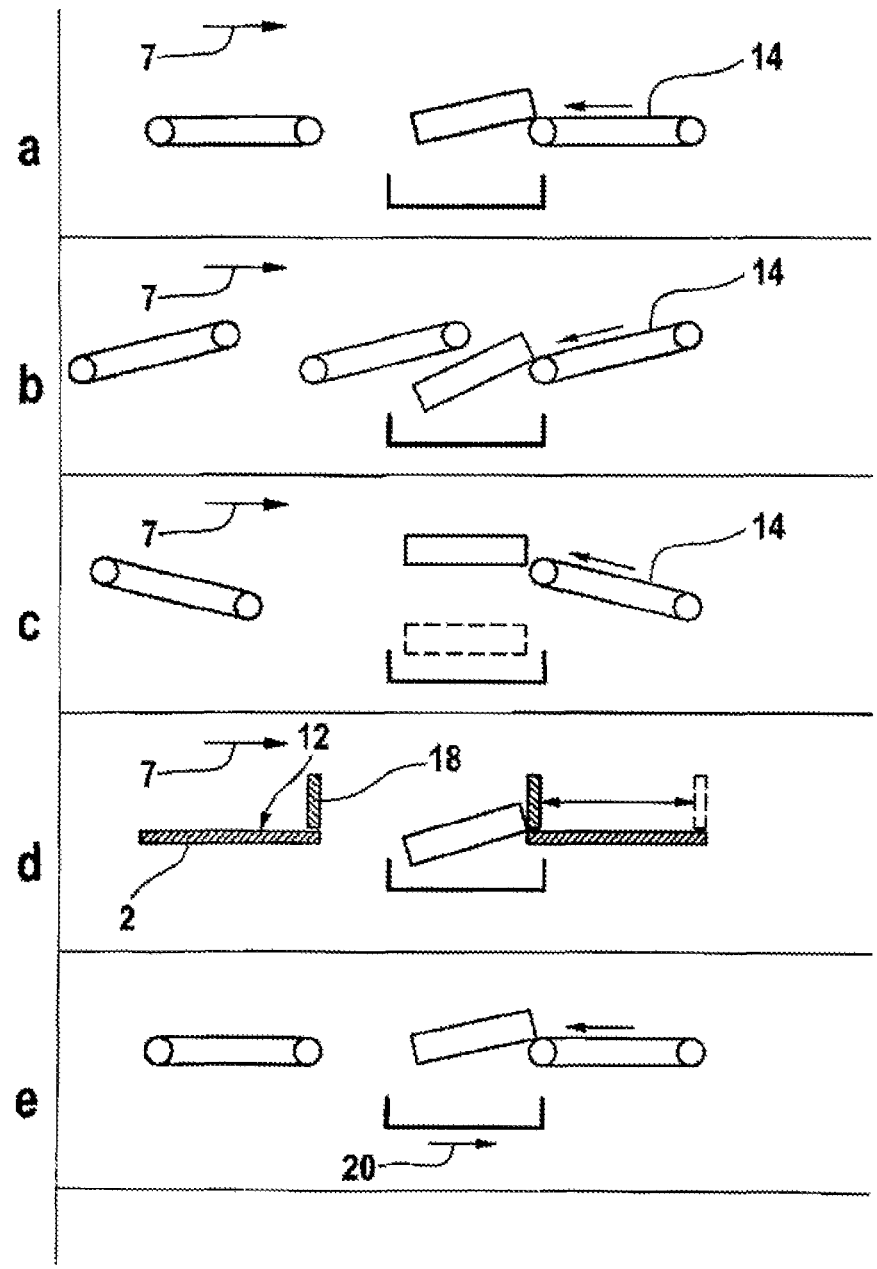
FIG. 3 shows a schematic perspective view of a conveyor apparatus of the invention.

FIG. 3 illustrates some variants of the embodiment of the invention described above. Whereas FIG. 3a illustrates the arrangement of FIGS. 1 and 3, FIG. 3b shows an arrangement of the pusher means or of the belt conveyor 8 which slopes upwards when seen in the direction of travel 7. The advantage of an arrangement of this kind is that the distance separating the transport units 2 can be reduced considerably depending on the angle of inclination of the pusher means and the height of the unit load items. Depending on the maximum height of the unit load items, the distance separating the transport units can be reduced to zero with an appropriate slope, or it is even possible to have a slight overlap.

FIG. 3c shows an embodiment in which the pusher means of the individual transport units are arranged to slope downwards when seen in the direction of travel 7, so that the individual unit load items are first transported upwards during the discharge process, which takes place contrary to the direction of travel, and then drop onto or into the receiving means 16 located below. The advantage of this embodiment is that because of the upwardly pointing discharge direction, the unit load items tend to drop in a horizontal position onto/into the receiving means 16.

FIG. 3d shows a variant in which the pusher means is designed not as a belt conveyor, but rather as a pusher member 18 which, like a belt conveyor, can—gradually or at an increasing speed relative to the transport unit—be driven at a pushing speed corresponding to the speed of travel and in this way gently pushes the unit load item 10 off the conveyor surface 12 of the transport unit 2.

FIG. 3e illustrates a special feature, which can be implemented in any of the embodiments of the invention, namely a receiving means 16 that travels along over one section and which can be moved at a speed 20 in the direction of travel which is less than the speed of travel of the conveyor apparatus itself. As a result, during the process of being pushed off, the unit load item 10 only needs to be moved at a lower pushing speed than is the case in the embodiments described previously. The pushing speed of the pusher means at the transport unit which is necessary for transferring the unit load item without any relative speed vis-à-vis the receiving means is the difference between the speed of travel of the transport unit and the speed 20 at which the receiving means 16 is being moved.

Figure 4:
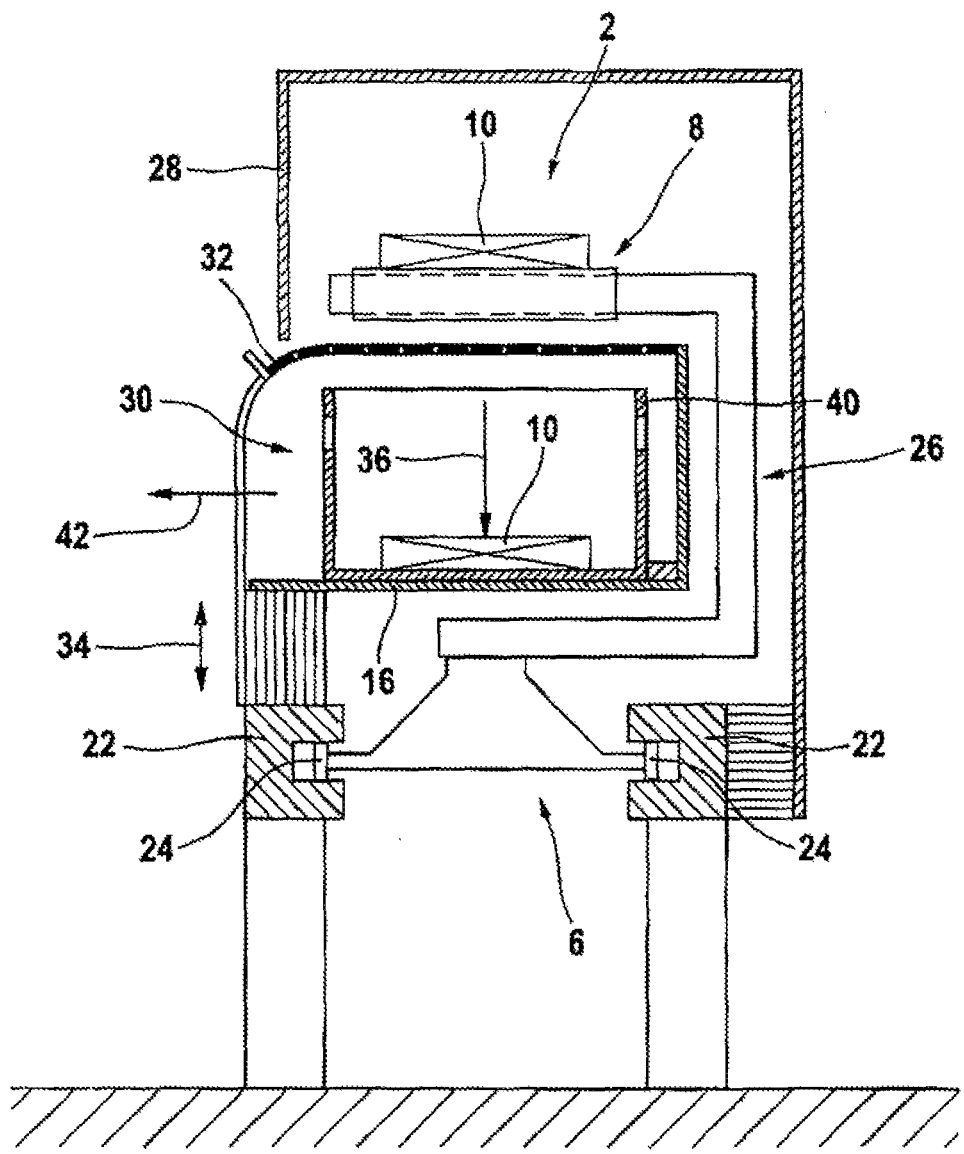
FIG. 4 shows a further embodiment of the invention.

FIG. 4 illustrates a further fundamental way of embodying the invention, namely arranging the transport units not to the side of, but rather above or below the guide means. As a specific example, FIG. 4 shows a conveyor apparatus—seen in cross-section, or in the direction of travel—with a carriage 6, guided in two mutually opposing runners 22, which are C-shaped in cross-section, and which form the guide means 4. Each carriage 6 has at least one running wheel 24 on each side, which is guided in a runner 22. A pusher means in the form of a belt conveyor 8 is arranged on a mount 26, which is generally approximately C-shaped, so that the mount is located centrally above the carriage 6 and the runners 22. On each carriage 6, one or more transport units 2 can be arranged with a corresponding number of pusher means 8.

The conveyor apparatus may be provided in some sections or over its entire length with a protective cover 28 that leaves an opening 30 free on a removal side (on the left in FIG. 4), which may be permanently open or may be opened and closed by means of, for example, a shutter 32. FIG. 4 shows an open position of the shutter 32 and its opening and closing direction 34.

In a gap formed between the carriage 6 and the pusher means 8, a receiving means 16 is arranged into which an item 10 discharged by the transport unit 2 drops from above in the direction of the arrow 36. In the simplest case, the receiving means 16 may be a flat surface, from which the items discharged are removed manually, or, as illustrated, a receptacle with a substantially horizontal bottom and a vertical rear wall to protect the moving parts against being touched. Optionally, a removable container 40, such as a basket or the like, may be provided in order, for example, to make it possible for a number of separate items discharged in succession to be removed together (removal means 42).

Alternatively, the receiving means 16 may, for example, have a roller path sloping downwards in the removal direction, so that a unit load item discharged is discharged automatically in the cross-direction.

In a modification of the principle illustrated in FIG. 4, it may be envisaged that the transport unit 2 is arranged not above the carriage 6, but beneath it. This creates the possibility of having unit load items deposited and discharged in a particularly space-saving manner.

The invention claimed is:

1. A conveyor apparatus with a plurality of transport units movable along a guide means, on an upper side of said transport units there being provided in each case a pusher means which can be driven contrary to a direction of travel of the transport units so that unit load items can be picked up and/or discharged so that the unit load items drop vertically down into a receiving means with substantially no relative horizontal speed, characterised in that the pusher means is drivable at a pushing speed which is at least as great as a speed of travel of the transport means concerned.

2. The conveyor apparatus as claimed in claim 1, characterised in that the pusher means is designed as a pusher, belt conveyor or roller table.

3. The conveyor apparatus as claimed in claim 1, characterised in that a conveyor surface of the pusher means is arranged parallel to the direction of travel.

4. The conveyor apparatus as claimed in claim 1, characterised in that the transport units are arranged spaced apart from one another in the direction of travel, by a distance which corresponds at least to a longitudinal dimension of a unit load item to be transported.

5. The conveyor apparatus as claimed in claim 1, characterised in that a conveyor surface of the pusher means is arranged at an upward slope, seen in the direction of travel.

6. The conveyor apparatus as claimed in claim 5, characterised in that the transport units are arranged spaced apart from one another in the direction of travel, by a distance which is smaller than a longitudinal dimension of the unit load items to be transported.

7. The conveyor apparatus as claimed in claim 1, characterised in that a conveyor surface is arranged at a downward slope, seen in the direction of travel.

8. The conveyor apparatus as claimed in claim 7, characterised in that the transport units are arranged spaced apart from one another in the direction of travel, by a distance which is greater than a longitudinal dimension of a unit load item to be transported.

9. The conveyor apparatus as claimed in claim 5, characterised in that the conveyor surfaces are arranged sloping at an angle of at least 2°, 5°, 10°, 15°, 20° or 30° to the horizontal.

10. The conveyor apparatus as claimed in claim 1, characterised in that each transport unit is arranged spaced apart laterally beside the guide means.

11. The conveyor apparatus as claimed in claim 1, characterised in that two transport units in each case are arranged on either side of the guide means, opposite each other.

12. The conveyor apparatus as claimed in claim 1, characterised in that the transport units are arranged spaced apart above the guide means.

13. The apparatus as claimed in claim 12, characterised in that the transport units are arranged on a C-shaped mount, seen in the direction of travel.

14. The apparatus as claimed in claim 12, characterised in that a receiving means is arranged in a gap between the guide means and the transport units.

15. The apparatus as claimed in claim 1, characterised in that the transport units are arranged spaced apart beneath the guide means.

\* \* \* \* \*